Oct. 24, 1950     C. M. ANDERSON     2,527,290
FRICTION BRAKE APPLIED AND RELEASED BY FLUID PRESSURE
Filed June 22, 1944     2 Sheets-Sheet 1

CARL M. ANDERSON
INVENTOR.
BY Lester B. Clark.
ATTORNEY

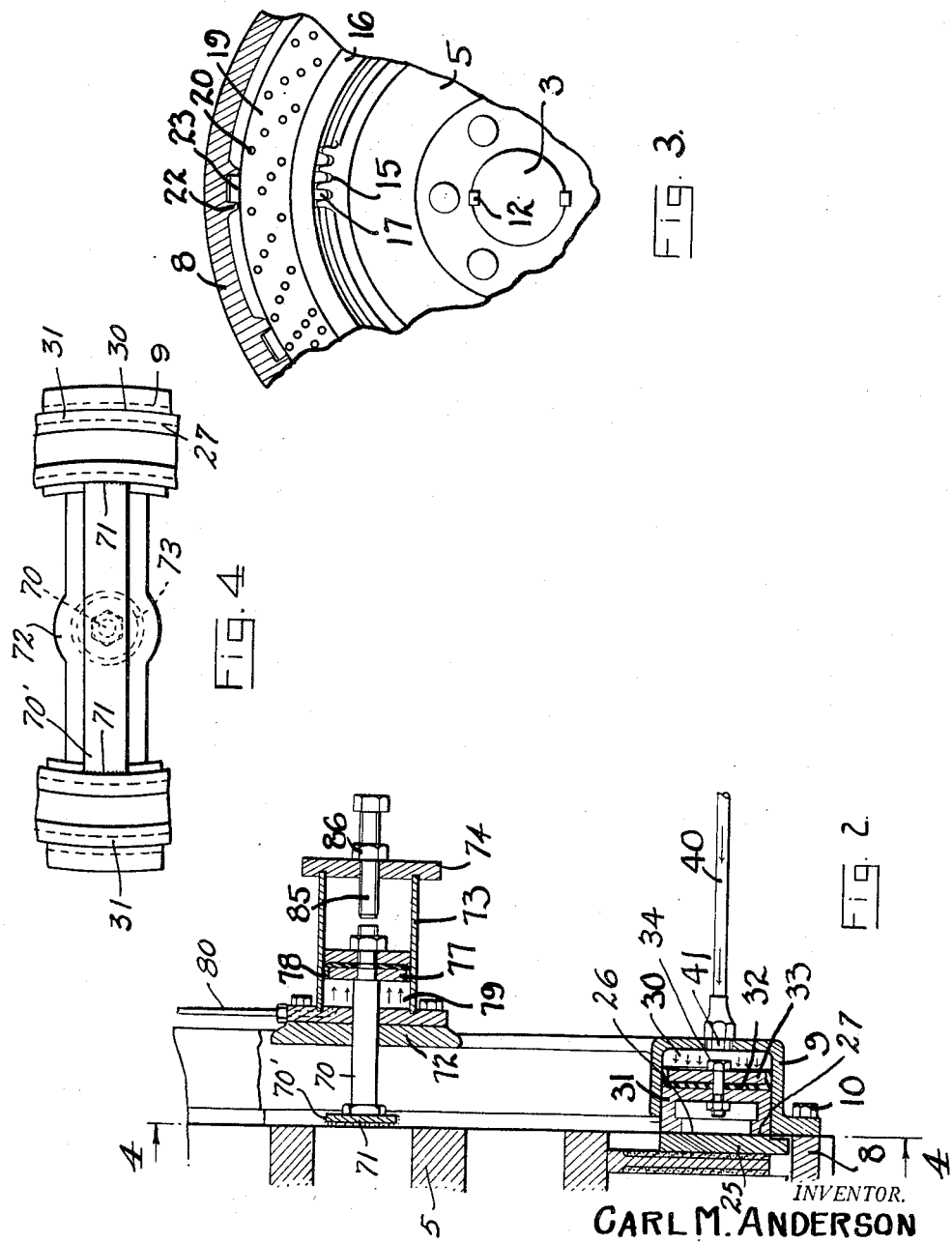

Patented Oct. 24, 1950

2,527,290

UNITED STATES PATENT OFFICE 2,527,290

FRICTION BRAKE APPLIED AND RELEASED BY FLUID PRESSURE

Carl M. Anderson, Corsicana, Tex., assignor, by mesne assignments, to Bethlehem Supply Company, a corporation of Delaware Application June 22, 1944, Serial No. 541,507

1 Claim. (Cl. 188—151)

The invention relates to a friction type of brake which is particularly adapted for performing the braking action where heavy loads are involved.

In the drilling of wells by the rotary method the string of drill pipe, the casing and other equipment must be lowered and raised in the hole and very often these loads approximate two or three hundred thousand pounds so that it is necessary that an efficient and adequate braking mechanism be provided.

It is one of the objects of the present invention to provide a friction type of brake wherein a series of discs are compacted by hydraulic pressure in order to accomplish the braking action.

Another object of the invention is to actuate a friction brake by the application of hydraulic pressure to force a series of alternately stationary and moving discs together.

Still another object of the invention is to provide a friction brake wherein the braking action is obtained by the application of hydraulic pressure and the brake moved to retracted position by pneumatic pressure.

Still another object of the invention is to provide a friction brake wherein the friction discs are readily removable and replaceable independently of the supporting structure therefor.

Other and further objects of the invention will be readily apparent when the following description is considered in connection with the accompanying drawings wherein:

Fig. 2 is a side elevation with certain parts in section showing the operating mechanism with the brake in braking position.

Fig. 3 is a broken detailed sectional view illustrating the manner of mounting the removable brake discs.

Fig. 4 is a broken detailed sectional view taken on the line 4—4 of Fig. 2 and showing the connecting means between the release spindle and the ring piston.

Figure 1:
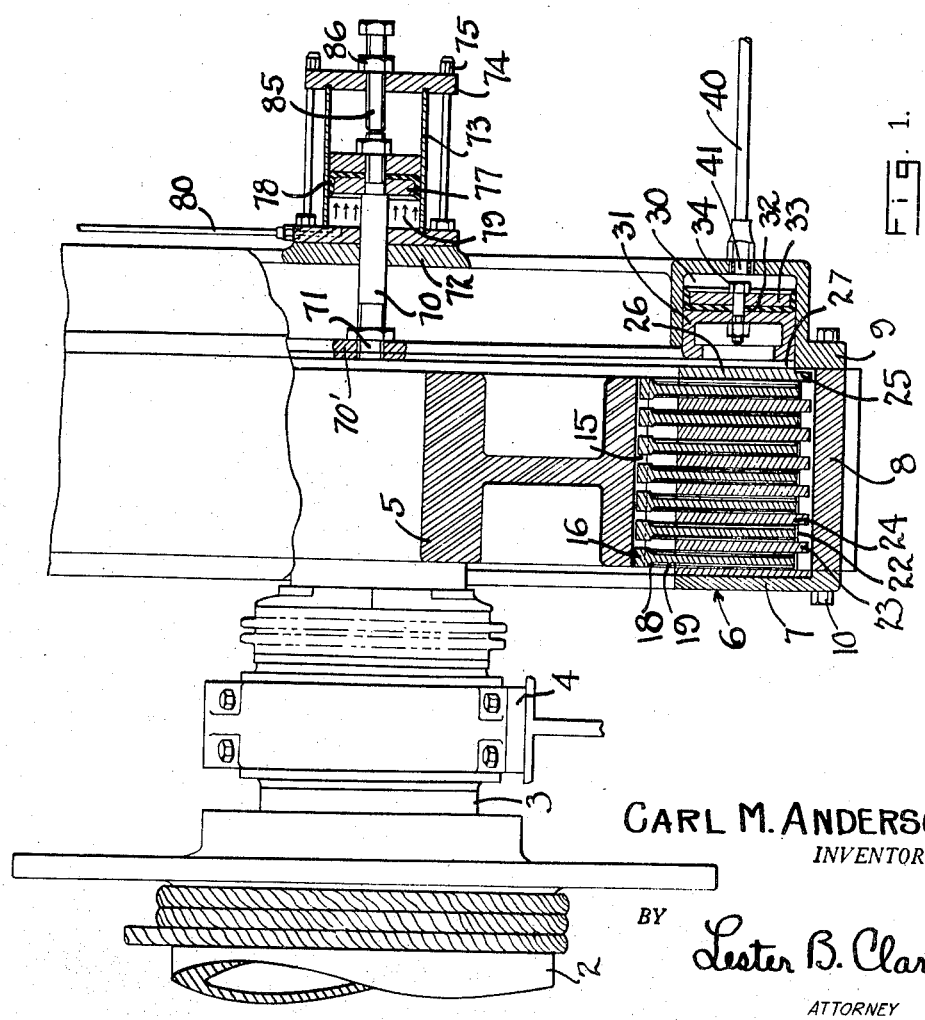
Fig. 1 is a side elevation with certain parts in section and illustrating the general arrangement of the parts with the brake in retracted position.

In Fig. 1 the invention has been illustrated in combination with a hoisting drum 2 which is mounted for rotation on a shaft 3 supported in the bearings 4. This shaft extends beyond the bearing 4 and has the brake hub 5 fixed thereon for rotation with the shaft 3.

While the invention is being described in combination with a hoisting drum it is to be understood that it may be used in any other location where a substantial braking action is to be obtained.

The hub 5 is shown as enclosed in a housing 6 which may be mounted on any suitable support so as to retain it against rotation. This housing may be made up of an inner plate 7, an intermediate friction disc supporting ring 8 and the outer casing 9. These three are shown as being held in assembled position by a series of bolts 10.

As seen in Fig. 3 the shaft 3 has the hub 5 nonrotatably mounted thereon by the keys 12 and this hub has a plurality of recesses 15 in its periphery which are preferably in the form of teeth which extend transversely of the hub and have somewhat the appearance of gear teeth. Fig. 3 shows only a short section of the teeth, but preferably they extend entirely around the hub.

These teeth are arranged to receive a series of friction rings or discs 16, the inner periphery of which is arranged with complementary ribs or teeth 17 which are shown in Fig. 3 as interfitting with the grooves 15. It seems obvious that these discs 16 may be slipped laterally on to the hub to assume the assembled position of Fig. 1. These brake discs are best seen in section in Fig. 1 and have the recessed sides 18, each of which is fitted with a ring of suitable friction material 19 which may be retained thereon by rivets 20.

The outer ring 8 as seen in Fig. 3 is also equipped with a series of teeth 22 which are arranged to receive the lugs 23 on the stationary friction rings 24 as best seen in Fig. 1. As illustrated, the alternate brake discs or rings are mounted on the hub and on the support ring 8 respectively. The rings 24 may also be provided with a suitable brake lining or friction material so that the contacting faces will be of suitable friction material which can be readily replaced after they have been subjected to wear. If desired, however, no friction material may be placed on one or the other series of the discs and a friction material and metal braking assembly may thereby be provided.

It seems obvious that in assembling the discs the housing and the hub can be arranged as seen in Fig. 1 with the casing 9 removed. The alternate discs can be slipped into place and then the casing 9 affixed. It also seems obvious that when no lateral pressure is applied to the arrangement of discs or rings that the hub 5 may rotate freely carrying its discs in position to rotate between the stationary discs carried by the supporting ring and there will be no braking action. All of the braking discs, both the rotating and the stationary, are free however for lateral sliding movement relative to either the hub or the supporting ring so that when a lateral pressure is applied the alternate discs will be forced together and a frictional resistance to turning imparted to the discs which are mounted on the hub 5.

The outer ring or plate 25 as seen in Fig. 1 has its face 26 exposed to the area 27 inside of the casing 9. The casing 9 is arranged with an annular recess or chamber 30 which is shown as containing a ring 31 which is in the form of a piston adapted to move axially of the housing and against the plate 25. This piston carries a sealing gasket 32 and a cap plate 33 which are held in position by a series of bolts 34. This entire construction is in the form of an annular ring slidable in the chamber 30 in the casing.

The pipe 40 is connected to a suitable hydraulic pressure system so that pressure applied in the pipe 40 passes through the opening 41 and fills the chamber 30 so as to apply a pressure to the piston 31 forcing it to the left as seen in Fig. 1 to compress or compact the friction discs. The braking action will, of course, be a direct function of the pressure applied through this pipe 40.

In order to effect retraction of the brake to loosen the plates and relieve the braking action a spindle 70 as shown in Fig. 4 is connected by means of a cross-bar 70' attached by welding or the like to the piston 31 at 71 and this spindle extends through the hub 72 on the casing 9 and projects into a cylinder 73 which is affixed on the casing by means of the closure plate 74 and the bolts 75. This spindle has a piston 77 thereon with a packing 78 arranged to confine pressure within the chamber 79 in the cylinder. A pipe 80 leads into said chamber 79 so that pneumatic or other pressure may be applied tending to move the piston 77 to the right and in this manner retract the piston or plunger 31 so as to release the brake discs.

In order to either set the brake at any desired position or to limit the retracting movement a set screw 85 is shown as threaded through the plate 74 and arranged to be locked in any desired position by a lock nut 86. If desired the brake may, as a matter of fact, be actuated by screwing up on this set screw 85 in event of failure of the hydraulic system.

Fig. 2 shows the arrangement just described, but with pressure being applied to the brake so as to accomplish a braking action.

What is claimed is:

A friction type brake for hoist drum comprising a wheel rotatable with the drum, a housing thereabout which is nonrotatable, a series of discs, means on said wheel and on said housing to slidably receive alternate ones of said discs, friction material carried by the faces of the discs, means including an annular plunger to hydraulically apply an axial pressure to said discs so as to increase the friction of the alternate moving and stationary faces, and separate and distinct fluid pressure means to retract said plunger so as to release said discs, comprising a cylinder centrally of said housing, a shaft and piston therein, said shaft being connected to said hydraulic means, and a connection for admitting fluid under pressure to said cylinder so as to move said piston to retract said plunger.

CARL M. ANDERSON.

REFERENCES CITED

The following references are of record in the file of this patent:

UNITED STATES PATENTS

| Number | Name | Date |
|---|---|---|
| 1,550,550 | McCauley | Aug. 18, 1925 |
| 1,650,338 | Fornaca | Nov. 22, 1927 |
| 1,664,680 | Hallett | Apr. 3, 1928 |
| 1,723,032 | Harrington | Aug. 6, 1929 |
| 1,743,367 | Maybach | Jan. 14, 1930 |
| 1,838,668 | Frock | Dec. 29, 1931 |
| 1,883,588 | Crane | Oct. 18, 1932 |
| 1,998,811 | Heaton | Apr. 23, 1935 |
| 2,002,990 | White | May 28, 1935 |
| 2,071,788 | Gillett | Feb. 28, 1937 |
| 2,172,788 | Christensen | Sept. 12, 1939 |
| 2,239,235 | Lambert | Apr. 22, 1941 |
| 2,240,218 | Lambert | Apr. 29, 1941 |
| 2,342,750 | Newell | Feb. 29, 1944 |

FOREIGN PATENTS

| Number | Country | Date |
|---|---|---|
| 6,724 | Great Britain | A. D. 1899 |